Oct. 2, 1956
J. McC. POLLARD
2,764,865
BLADE FOR ROTARY MOWER
Filed Dec. 21, 1953
2 Sheets-Sheet 1
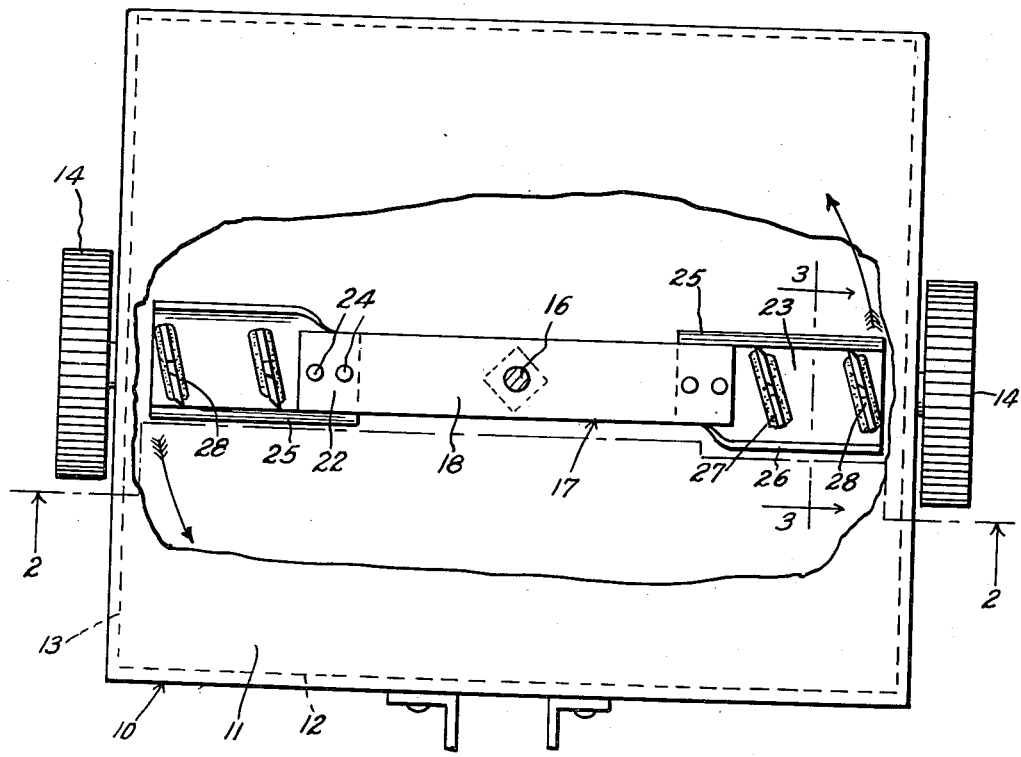
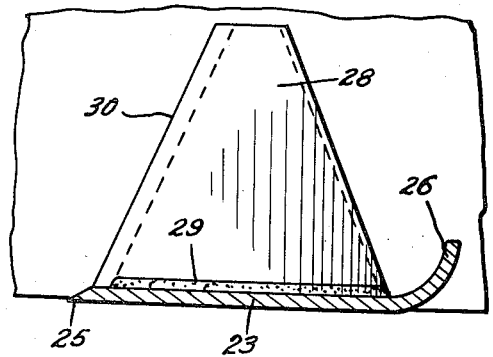
INVENTOR
J. M. Pollard
BY Kimmel & Crowell
ATTORNEYS

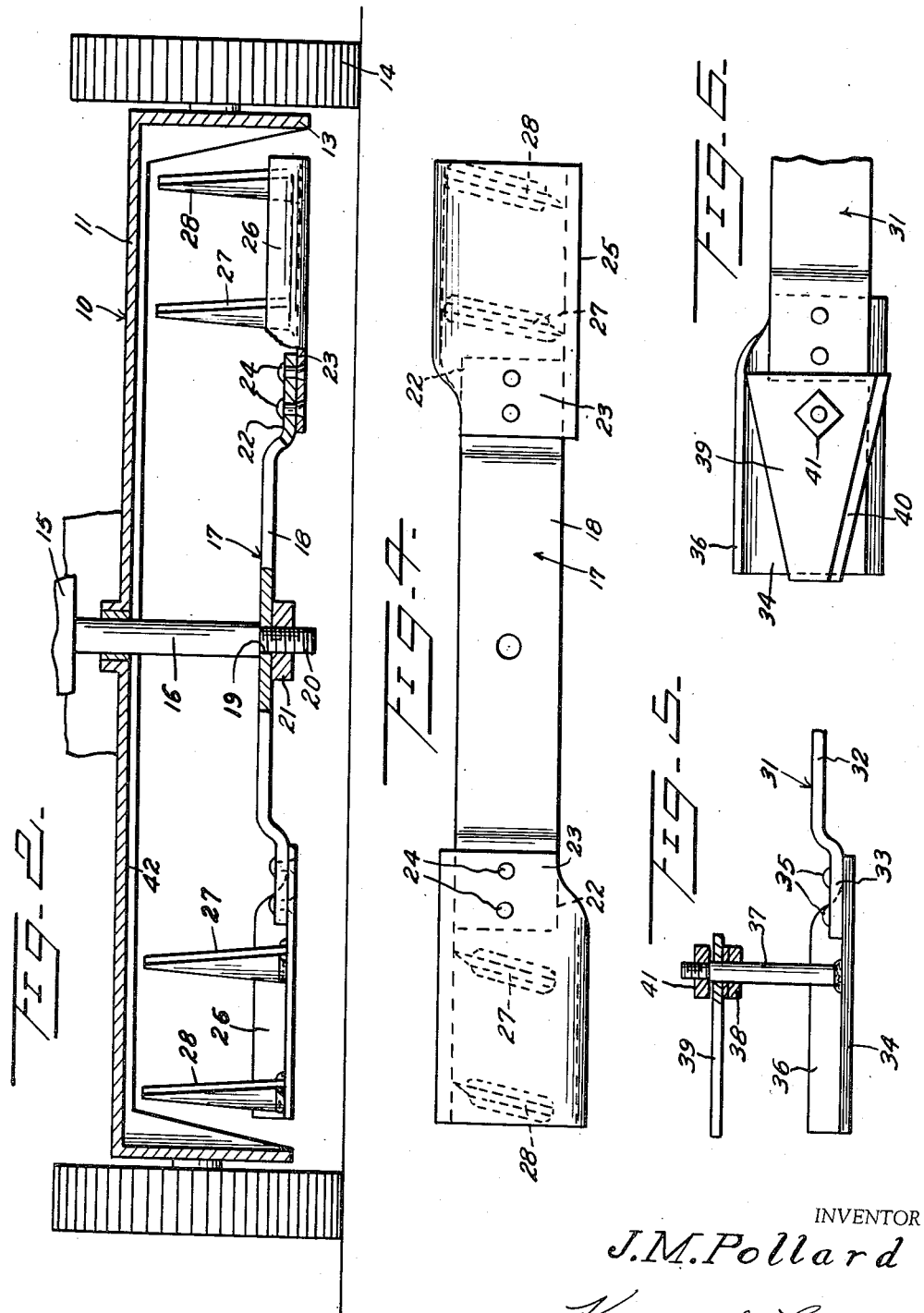

United States Patent Office 2,764,865
Patented Oct. 2, 1956

2,764,865

BLADE FOR ROTARY MOWER

John McCollum Pollard, Greensboro, N. C.

Application December 21, 1953, Serial No. 399,527

4 Claims. (Cl. 56—295)

This invention relates to a rotary mower.

An object of this invention is to provide in a rotary mower, a blade structure for not only cutting grass, but also cutting or mulching leaves, so that the finely cut leaves may be used for fertilizer.

Another object of this invention is to provide in a rotary mower, a blade structure embodying an elongated bar or carrier having a horizontal cutter at each end with the trailing end of the cutter upturned so as to produce an updraft of air in addition to throwing the cut grass and leaves upwardly within the shield which is normally about the cutter structure. Each horizontal cutter also has fixed to the upper side thereof a pair of upstanding cutter blades which are adapted to cut up the rising grass and leaves into fine particles.

A further object of this invention is to provide a blade structure for a rotary mower which can be readily mounted on various types of rotary mowers.

With the above and other objects in view, my invention consists in the arrangement, combination and details of construction disclosed in the drawings and specification, and then more particularly pointed out in the appended claims.

In the drawings:

Figure 1 is a plan view partly broken away showing a rotary mower having a mulching blade mounted thereon constructed according to an embodiment of this invention.

Figure 2 is an enlarged sectional view taken on the line 2—2 of Figure 1.

Figure 3 is an enlarged fragmentary view taken on the line 3—3 of Figure 1.

Figure 4 is an enlarged bottom plan view of the blade structure.

Figure 5 is a fragmentary side view with parts broken away and shown in section of a modified form of this invention.

Figure 6 is a fragmentary plan view of the structure shown in Figure 5.

Referring to the drawings the numeral 10 designates generally a frame structure which is formed of a top wall 11, a rear wall 12, and opposite side walls 13. A pair of traction wheels 14 are rotatably carried by the side walls 13.

A power member generally indicated at 15 is disposed on the upper side of the frame structure 10 and includes a vertically disposed drive shaft 16 extending downwardly through the top wall 11. The lower end of the shaft 16 has mounted thereon a cutting blade structure generally indicated at 17. The blade structure 17 includes an elongated flat bar 18 formed with an opening 19 through which the threaded stud 20 carried by the shaft 16 engages and a nut 21 is threaded on the stud 20. Bar 18 is formed with downwardly offset outer end portions 22 and a horizontally disposed cutting blade 23 is secured to each offset portion 22 by fastening means 24.

The horizontal cutting blade 23 is formed with a keen leading edge 25 and with an upturned trailing edge 26. The trailing edge 26 is adapted to form an upward draft of air so that leaves or other particles will be thrown upwardly and a suction will be created below the blade structure 17.

A pair of upstanding substantially triangular cutting blades 27 and 28 are fastened as by welding 29 or the like to the upper side of the horizontal blade 23 and the upstanding or vertical blades 27 or 28 are formed with a keen or cutting edge 30 at the leading edge thereof.

Preferably as shown in Figure 1, the upstanding blades 27 and 28 are disposed on an oblique angle relative to the length of the blade 23. The horizontal blade 23 is adapted to provide one cutting means for cutting upstanding grass, leaves or the like and the vertical blades 27 and 28 are adapted to cooperate with the blades 23 in very finely cutting the grass and leaves which are forced upwardly above the blade structure 17.

In practice the updraft of air created by the horizontal blade 23 will cause the material to rise upwardly against the lower side 42 of the top wall 11. As the material rises against the lower side 42 of the top wall 11 the upstanding blades 27 and 28 will very finely cut the material so that this material upon dropping to the ground will provide a mulch or fertilizer.

Referring now to Figures 5 and 6 there is disclosed a modified form of this invention wherein a blade structure 31 is adapted to be mounted on the drive shaft 16. The blade structure 31 is formed of an elongated flat bar 32 having downwardly offset end portions 33 on which horizontal cutting blades 34 are secured by a fastening means 35. The horizontal blades 34 are provided with upturned trailing edges 36 so as to create an updraft of air beneath the housing or hood structure of the mower.

A vertically disposed post 37 is fixed to and projects upwardly from the horizontal blade 34 and the post 37 is provided adjacent the upper end thereof with a fixed collar or thrust member 38. A horizontally disposed cutting blade 39 is loosely mounted on the post 37 and bears against the upper side of the collar or thrust member 38.

The blade 39 is formed with a keen leading edge 40 and blade 39 is preferably formed of substantially truncated triangular configuration. A nut 41 is threaded on the upper end of the post 37 and loosely bears against the upper side of the blade 39.

In the use and operation of this device the blade structure 17 is secured by fastening means 21 on the lower end of the drive shaft 16. As blade structure 17 rotates the grass, leaves, or other material, which comes into contact with the horizontal blades 23, will be cut and the upturned trailing edge 26 of each blade 23 will cause the cut material to be thrown upwardly. The upturned trailing edges 26 will produce an updraft of air against the lower side 42 of the top wall 11 and as the material rises upwardly and accumulates against the lower side 42 of the top wall 11 this material will be very finely cut up by means of the upstanding mulching or cutting blades 27 and 28.

The upstanding blades 27 and 28 will prevent any long grass or other strands from being attached to the blade structure 17 so that the cutting blades carried by the bar 17 will be maintained in a clean cutting condition at all times. This device will provide a means in the form of an attachment for a conventional rotary mower whereby the mower may not only be used for cutting grass and at the same time producing a mulch from the cut grass but will also cut up leaves or other similar material which may be on the ground.

What is claimed is:

1. A cutting blade structure for a rotary mower comprising an elongated bar, a horizontal cutting blade at each end of said bar, each blade being formed with an upturned trailing edge for creating an updraft, an upstanding post fixed to each blade, and at least one horizontal mulching blade carried by said post above said cutting blade, whereby said first horizontal blade is adapted to cut grass and by means of the upturned trailing edge thereof move the grass into the path of said second horizontal blade for mulching thereby.

2. A device as claimed in claim 1 in which the mulching blade is pivoted to said upstanding post.

3. A device as claimed in claim 1 in which the mulching blade is removably journalled on said upstanding post.

4. A cutting blade structure for a rotary mower comprising an elongated bar, a horizontal cutting blade detachably secured to each end of said bar, each cutting blade having an upturned trailing edge for creating an updraft, at least one horizontal mulching blade positioned above each of said cutting blades, and means pivotally mounting said mulching blade to said cutting blade.

References Cited in the file of this patent

UNITED STATES PATENTS

| | | |
|---|---|---|
| 578,250 | Holland et al. | Mar. 2, 1897 |
| 2,476,394 | Webb et al. | July 19, 1949 |
| 2,547,540 | Roberts | Apr. 3, 1951 |
| 2,571,455 | Keiper | Oct. 16, 1951 |
| 2,641,100 | Sylvester | June 9, 1953 |
| 2,651,159 | Rountree | Sept. 8, 1953 |
| 2,669,084 | Warren | Feb. 16, 1954 |
| 2,697,322 | Watrous | Dec. 21, 1954 |
| 2,706,441 | Caldwell et al. | Apr. 19, 1955 |